US010489736B2

(12) United States Patent
Briganti et al.

(10) Patent No.: US 10,489,736 B2
(45) Date of Patent: Nov. 26, 2019

(54) BEHAVIORAL PROFILING WITH ACTIONABLE FEEDBACK METHODOLOGIES AND SYSTEMS

(71) Applicant: Swarm Vision, Inc., Los Altos, CA (US)

(72) Inventors: Suzan Briganti, Los Altos, CA (US); Katherine Laraine Dechow, Redwood City, CA (US); Alain Samson, London (GB)

(73) Assignee: Swarm Vision, Inc, Los Altos, CA (US)

( * ) Notice: Subject to any disclaimer, the term of this patent is extended or adjusted under 35 U.S.C. 154(b) by 604 days.

(21) Appl. No.: 15/069,802

(22) Filed: Mar. 14, 2016

(65) Prior Publication Data

US 2016/0275434 A1    Sep. 22, 2016

Related U.S. Application Data

(60) Provisional application No. 62/133,769, filed on Mar. 16, 2015.

(51) Int. Cl.
*G06Q 10/06* (2012.01)

(52) U.S. Cl.
CPC ............ *G06Q 10/06398* (2013.01); *G06Q 10/063112* (2013.01); *G06Q 10/063118* (2013.01)

(58) Field of Classification Search
CPC .......................................... G06Q 10/00–50/00
USPC .............................................. 705/7.11–7.42
See application file for complete search history.

(56) References Cited

U.S. PATENT DOCUMENTS

| | | | |
|---|---|---|---|
| 6,923,653 B2 * | 8/2005 | Ito | G06Q 10/06 434/236 |
| 2006/0247943 A1 | 11/2006 | Kapoor | |
| 2008/0167936 A1 * | 7/2008 | Kapoor | G06Q 10/00 705/7.14 |
| 2009/0234688 A1 * | 9/2009 | Masuyama | G06F 17/30707 706/50 |
| 2009/0286217 A1 * | 11/2009 | Kobayashi | G06Q 10/10 434/350 |
| 2009/0327051 A1 | 12/2009 | Nerby | |
| 2010/0279267 A1 | 11/2010 | Swanson | |
| 2011/0178940 A1 | 7/2011 | Kelly et al. | |

(Continued)

FOREIGN PATENT DOCUMENTS

WO    WO2016149216 A1    9/2016

OTHER PUBLICATIONS

Thompson, John L. "The facets of the entrepreneur: identifying entrepreneurial potential." Management decision 42.2 (2004): 243-258. (Year: 2004).*

(Continued)

*Primary Examiner* — Alan S Miller
(74) *Attorney, Agent, or Firm* — Royse Law Firm, PC

(57) ABSTRACT

Embodiments of the present disclosure are directed to behavioral profiling with actionable feedback methodologies and systems. Benchmarking of profiles against empirical data can be utilized to determine areas of weakness in profiles or asymmetries relative to a benchmark. Feedback methodologies allow for optimization of individualized profiles and re-evaluation of behavioral profiling based on empirical data, as well as optimal profile grouping.

15 Claims, 11 Drawing Sheets

(56) References Cited

U.S. PATENT DOCUMENTS

2016/0055436 A1* 2/2016 Al-Taha .............. G06Q 10/101
705/7.36
2016/0275434 A1 9/2016 Briganti et al.

OTHER PUBLICATIONS

Wakkee, Ingrid, Tom Elfring, and Sylvia Monaghan. "Creating entrepreneurial employees in traditional service sectors." International Entrepreneurship and Management Journal 6.1 (2010): 1-21. (Year: 2010).*
Srivastava, Nidhi, and Anand Agrawal. "Factors supporting corporate entrepreneurship: an exploratory study." Vision 14.3 (2010): 163-171. (Year: 2010).*
De Jong, Jeroen PJ, and Deanne N. Den Hartog. "How leaders influence employees' innovative behaviour." European Journal of innovation management 10.1 (2007): 41-64. (Year: 2007).*
Jackson, Denise. "Employability skill development in work-integrated learning: Barriers and best practice." Studies in Higher Education 40.2 (2015): 350-367. (Year: 2015).*
International Search Report and Written Opinion dated Jul. 29, 2016 in Patent Cooperation Treaty Application No. PCT/US2016/022374, filed Mar. 14, 2016, 18 pages.

* cited by examiner

| SKILL CLUSTER | SUB-CLUSTERS AND DESCRIPTION | SUB-CLUSTER SCORE YOU | SUB-CLUSTER SCORE BENCH MARK | SKILL CLUSTER SCORE YOU | SKILL CLUSTER SCORE BENCH MARK |
|---|---|---|---|---|---|
| DRIVE | AMBITION: Needs to make a big, real world impact. Seeks important problems to solve and opportunities to address. | 93 | 83 | 93 | 81 |
| DRIVE | INITIATIVE: Initiates new endeavors and undertakes action to address problems or opportunities. | 80 | 80 | | |
| DRIVE | INTENSITY: Has abundant energy, an intense drive to understand; pushes himself to constantly learn and grow. | 100 | 80 | | |
| DRIVE | PERSISTENCE: Able to persist to overcome roadblocks and setbacks. | 100 | 80 | | |
| DISRUPT | BOUNDARY BREAKING: Unconcerned with hierarchy or conventional approaches. | 93 | 73 | 96 | 77 |
| DISRUPT | THRIVING IN UNCERTAINTY: At their best when situations are undefined. | 100 | 80 | | |
| DISRUPT | CONFIDENCE: Has an out-sized dose of self-confidence | 95 | 83 | | |
| CREATE | NOVELTY SEEKING: Has an appetite for the new and detects opportunity in change. Low boredom threshold. | 85 | 83 | 87 | 81 |
| CREATE | PROBLEM SOLVING: Loves to solve problems and experiment. | 80 | 85 | | |
| CREATE | UNCOMMON CONNECTIONS: Sees connections between things that others don't think are related. | 100 | 80 | | |
| CREATE | GROWTH MINDSET: Finds it stimulating to learn new things, explore new concepts and ideas. | 83 | 80 | | |
| CONNECT | RELATING: Reads social signals and adapts to connect with different audiences, levels and across cultures. | 77 | 82 | 76 | 79 |
| CONNECT | PERSUADING: Highly persuasive, always "on" promoting their initiatives. | 80 | 78 | | |
| CONNECT | TEAM-BUILDING: Detects useful talents in others; forms and inspires teams to complement their own strengths. | 80 | 80 | | |
| CONNECT | SOCIAL INTELLIGENCE: Can navigate their way through complex organizations. Perceives what others need, or are trying to do or say — without a lot of explanation. | 60 | 73 | | |

*FIG. 6A*

| SKILL CLUSTER | SUB-CLUSTERS AND DESCRIPTION | SUB-CLUSTER SCORE | | SKILL CLUSTER SCORE | |
|---|---|---|---|---|---|
| | | YOU | BENCH MARK | YOU | BENCH MARK |
| CONTROL | 360-DEGREE INVOLVEMENT: Takes an interest in all aspects of an undertaking. | 70 | 80 | 75 | 81 |
| | COMPETITIVENESS: Competes against their own ideals, and aspires to live up to diverse role models. | 80 | 80 | | |
| | FINANCIAL ORIENTATION: Enjoys managing money, has a positive relationship with it. Expects big market rewards. | 76 | 82 | | |
| THINK | INFORMATION CAPACITY: Retains massive amounts of information. Able to draw on it in thought processes. | 100 | 80 | 87 | 78 |
| | RAPID PATTERN RECOGNITION: Not relying on mere logic or inherited wisdom. Sees emergent patterns and underlying frameworks. | 100 | 80 | | |
| | REFLECTION: Reflects on the outcomes and improves from conscious effort. | 60 | 80 | | |
| DELIVER | CONTEXTUAL GOAL ORIENTATION: Goal-driven, yet flexible about how best to achieve the goal. | 100 | 80 | 91 | 80 |
| | RESOURCEFULNESS: Able to make something out of nearly nothing. Constraints make him even more focused. | 93 | 80 | | |
| | ADAPTABILITY: Can adapt and "pivot" in changing contexts. Knows when to do so vs. holding course. | 80 | 80 | | |
| GIVE | BENEFITING OTHERS: Sees himself as a giver. Invests in teams and individuals. Wants to make others lives better. | 60 | 80 | 70 | 80 |
| | MAKING THE WORLD BETTER: Believes his innovations make the world better. Prefers to empower others through sustainable skills and scaleable opportunities. | 80 | 80 | | |

BEHAVIORAL PROFILING WITH ACTIONABLE FEEDBACK METHODOLOGIES AND SYSTEMS

CROSS REFERENCE TO RELATED APPLICATIONS

This application claims the benefit and priority of U.S. Provisional Application Ser. No. 62/133,769, filed on Mar. 16, 2015, which is hereby incorporated by reference herein in its entirety, including all references and appendices cited and incorporated therein.

FIELD OF INVENTION

The present disclosure is related in general to behavioral profiling, and more specifically, but not by limitation to systems and methods that utilize databases and identify asymmetries in profiles, and remediate the same using actionable feedback methodologies.

SUMMARY

According to some embodiments, the present disclosure is directed to a method that comprises: (a) creating database records that comprise an innovation profile for a plurality of individuals, the innovation profile being indicative of an innovation score for each of the plurality of individuals, wherein the innovation score is a composite of an entrepreneur score and an intrapreneur score; (b) identifying a portion of the plurality of individuals having an innovation score that does not meet or exceed an innovator benchmark score or general population score; (c) generating feedback that improves the innovation score for the portion of the plurality of individuals that does not meet or exceed an innovator benchmark score or general population score; (d) re-evaluating the innovation profile for the plurality of individuals; (e) updating database records with the re-evaluated innovation profiles; and (f) generating a report for a manager of the team when the innovation profile for the plurality of individuals in the team meets or exceeds the innovator benchmark score or the general population score.

According to some embodiments, the present disclosure is directed to a method that comprises: (a) a step for creating database records that comprise an innovation profile for a plurality of individuals in a team, the innovation profile being indicative of an innovation score for each of the plurality of individuals, wherein the innovation score is a composite of an entrepreneur score and an intrapreneur score; (b) a step for identifying a portion of the plurality of individuals having innovation scores that do not meet or exceed an innovator benchmark score or general population score; (c) a step for generating feedback that improves the innovation score for the portion of the plurality of individuals that does not meet or exceed an innovator benchmark score or general population score; (d) a step for re-evaluating the innovation profile for the plurality of individuals; (e) a step for updating database records with the re-evaluated innovation profiles; and (f) a step for generating a report for a manager of the team when the innovation profile for the plurality of individuals in the team meets or exceeds the innovator benchmark score or the general population score.

According to some embodiments, the present disclosure is directed to a system that comprises: (a) a memory for storing instructions; and (b) a processor for executing the instructions to: (i) (a) provide an innovation profile assessment to a plurality of individuals accessible through a web browser interface; (b) create database records that comprise an innovation profile for the plurality of individuals; (c) assigning to an individual a skill type selected from ideator, optimizer, visualizer, and influential, based on the innovation profile; (d) generating a team from individuals of the plurality of individuals by: (i) receiving a project type selected from commercial innovation, incremental innovation, and breakthrough innovation, wherein the project type is associated with innovation skill groups; and (ii) automatically selecting the team by matching roles assigned to the individuals against the innovation skill groups of the project type by querying the database records.

According to some embodiments, the present disclosure is directed to a method that comprises: (a) testing a sample of participants to determine each participant's aptitude for at least one innovation skill; (b) based on the testing, generating at least one question predictive of a respondent's aptitude for the at least one innovation skill; (c) administering the at least one question to the respondent; (d) analyzing the respondent's response to the at least one question; (e) scoring the respondent's aptitude for the at least one innovation skill; and (f) based on the scoring, determining whether the respondent should be a team member and for what role the member is best suited.

According to some embodiments, the present disclosure is directed to a method that comprises: (a) interviewing a sample of successful innovators to identify a set of characteristics of the innovators; (b) based on the interviewing, generating at least one question predictive of a respondent's aptitude for at least one innovation skill; (c) administering the at least one question to the respondent; (d) analyzing the respondent's response to the at least one question; (e) scoring the respondent's aptitude for the at least one innovation skill; and (f) based on the scoring, determining whether the respondent should be a team member.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIGS. 6A and 6B collectively illustrate a sample report that can be transmitted along with the graphical representation of FIG. 5.

DETAILED DESCRIPTION

Figure 1:
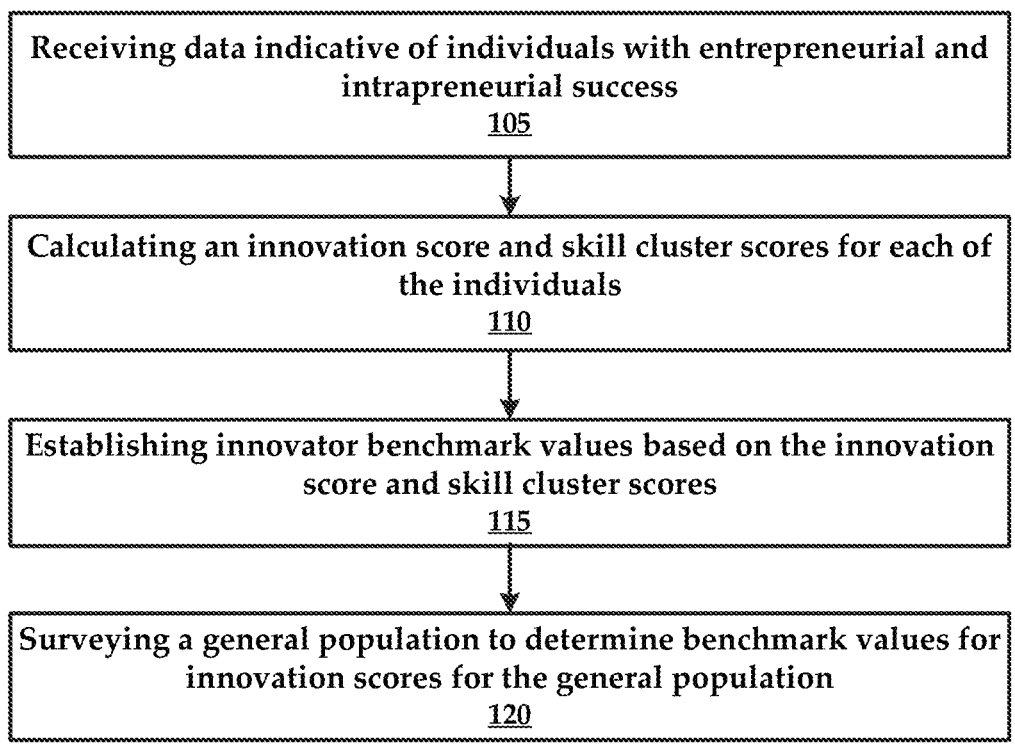
FIG. 1 is a flowchart of an example method for creating a survey in accordance with the present disclosure.

Embodiments of the present disclosure are directed to behavioral profiling with actionable feedback methodologies and systems. Benchmarking of profiles against empirical data can be utilized to determine areas of weakness in profiles. Feedback methodologies allow for optimization of individualized profiles and re-evaluation of behavioral profiling based on empirical data.

According to some embodiments, a profiler system can implement an algorithm that considers an individual's responses to various survey questions for each role (entrepreneur, intrapreneur, champion, and implementer) and for each of eight skill clusters and 26 sub-clusters. The algorithm includes assigning weights to each of these questions based on how well they differentiate the individual versus general population scores, and how well the scores correlate with business results (project types). The algorithm implements an acquiescence filter that detects and adjusts for an individual's high inclination to agree with all questions, even reverse-coded questions that flags and adjusts for individuals answering in such a way as to conform to generally desirable social traits (expectations or norms).

The results are automatically converted to an index. The "Innovator Benchmark" is calculated as the median score for the Top 30% of innovators. In some embodiments, individual results are shown compared to the Innovator Benchmark.

Some embodiments of the present disclosure relate to systems and methods for creating an innovational or entrepreneurial team. Successful innovation or entrepreneurship is often driven by individuals with a range of skills. A single individual typically does not possess all of these skills, and teams of innovators or entrepreneurs are most likely to be successful if their members possess complementary skills. Through research and development, questionnaires can be developed to categorize respondents according to their innovative or entrepreneurial skill sets. Such categorization enables startup founders, enterprises, or crowdsourcing communities to build innovation or entrepreneurial teams that possess the necessary and appropriate skills to attain their innovation or entrepreneurial goals.

In exemplary embodiments, a group of participants selected from the general population is tested to determine the participants' capacity for generating ideas. For example, participants are asked to generate ideas for making an everyday object more fun or useful. Each participant's test results may be scored along two dimensions—a prolificacy scale and a disruption scale. The same group of participants may also be asked to answer a series of self-descriptive questions relating to traits commonly associated with innovators, such as curiosity, independent thinking, impatience with the status quo, accomplishment in the visual arts, scientific inquiry or inventions, number of social connections and social influence. The participants' answers may be cross-referenced and correlated with their respective idea prolificacy and disruption scores. In some embodiments, the self-descriptive questions that correlate highly with high prolificacy and disruption scores are retained, while questions with a low correlation are discarded. The retained self-descriptive questions may be presented to participants in, for example, a crowdsourcing community, to identify individuals with a high capacity for generating novel ideas. A similar method may be utilized to identify individuals with a high capacity for optimizing ideas, communicating ideas, and popularizing ideas, among others. A questionnaire comprising self-descriptive questions selected through application of the above method is presented to respondents, and the respondents' innovation skills are identified based on their answers to the questionnaires, according to some embodiments. The order of questions presented to each respondent may be randomized to eliminate order bias.

According to various embodiments, a sample of successful innovators and advisors familiar with innovators are interviewed to determine the innovators' motivations, attitudes, beliefs, and behaviors from the innovators' point of view. The sample included entrepreneurs, who are founders or co-founders of a business, and intrapreneurs, who have created a new product or business within an existing organization. Based on results of the interviews and existing academic research, hypotheses regarding the main traits of entrepreneurs and intrapreneurs may be generated. Questions relating to each of the hypotheses may then be generated, and an initial survey comprising the generated questions may be prepared. The initial survey may be fine-tuned by presenting the survey to a sample of entrepreneurs and intrapreneurs and determining the predictive power of each question.

The survey may be further tested on a large sample that may include participants from various geographical regions in different stages of economic development and with divergent cultures. In some embodiments, the results are analyzed to identify the following: (1) self-descriptive questions that correlated with objective questions for entrepreneurs, intrapreneurs, and innovation implementers, (2) self-descriptive questions that best differentiated entrepreneurs, intrapreneurs, and innovation implementers from the general population and from each other, (3) questions that statistically correlated with one another into clusters that may identify specific skill sets, and (4) how application of filters for business results and inventions focuses the entrepreneurial profile. The survey may be further improved by implementing a second global study.

In some embodiments, a profiler system utilizes survey questions that elicit responses from individuals in an organization or group. The questions are constructed to determine innovation skills of the respondents.

As used herein, "innovation skills" may include an individual's skills (e.g., for, lateral thinking, drawing connections, or for generating ideas, optimizing ideas, communicating ideas, or popularizing ideas), attitudes (e.g., perseverance, confidence,), motivations (e.g., desire to change the world or challenge the status quo), and other behavioral/personality traits (e.g., social intelligence, detail orientation, competitiveness, adaptability, or intensity).

According to some embodiments, the present disclosure is directed to systems and methods that implement and utilize behavioral profiling and actionable feedback loops to identify innovation characteristics of individuals in enterprises and organizations. FIG. 1 is a flowchart of an example method for creating a survey. The method includes a step 105 of receiving data indicative of individuals with entrepreneurial and intrapreneurial success, as described above.

In general, the method and system, in some embodiments, is configured to suggest or create optimal innovation teams based on behavior profiling and benchmarking across various skill clusters and sub-clusters. Thus, the method and system will produce a more effective innovation team compared to processes that do not utilize the behavior profiling and analysis described herein.

The method can be executed within the context of a profiler system. Some aspects of the profiler system are described with reference to FIG. 8. Functional aspects of the profiler system are described throughout the present disclosure.

Once the relevant data has been collected with the profiler system, the method can include a step 110 of calculating an innovation score and skill clusters for each of the individuals. The method can also include a step 115 of establishing innovator benchmark values based on the innovation score and skill clusters. Again, these benchmark values are created based on individuals with entrepreneurial and intrapreneurial success.

In a sub-process, the method can include a step 120 of surveying a general population to determine benchmark values for innovation scores for the general population.

Thus, each individual analyzed by the profiler system can be compared against an innovation benchmark score for (1) individuals with entrepreneurial and intrapreneurial success; and (2) general population individuals.

In various embodiments, a final version of the survey comprising questions generated through the above method is presented to employees of innovating enterprises, prospective members of founding teams, or any other group to identify each respondent's innovation or entrepreneurial skill sets. This enables founders, investors, and enterprises to build innovational or entrepreneurial teams with the appropriate skill sets to maximize the likelihood of success of innovative endeavors. Additionally, by administering the survey to an existing entrepreneurial team, investors may be able to determine the likelihood of success of the entrepreneurial team and decide whether or not to provide funding to the team.

In an example embodiment, individuals in an organization are surveyed to create innovation profiles. To be sure, while the individuals can be from an organization, the present disclosure can be used on any population, including in a crowd-based application where individuals in any geographical location can be profiled for their innovation attributes.

In some embodiments, the innovation profile is indicative of an innovation score for each of the plurality of individuals. The innovation score in some instances is a composite of an entrepreneur score and an intrapreneur score for the individual.

Entrepreneurs are defined as people who found or co-found new businesses outside of any existing structures. Intrapreneurs are people who create new products and businesses within existing organizations. An individual's survey results show how they score on an overall innovation benchmark index, as well as their scores on eight skill clusters and 26 sub-clusters, in some embodiments.

Figure 8:
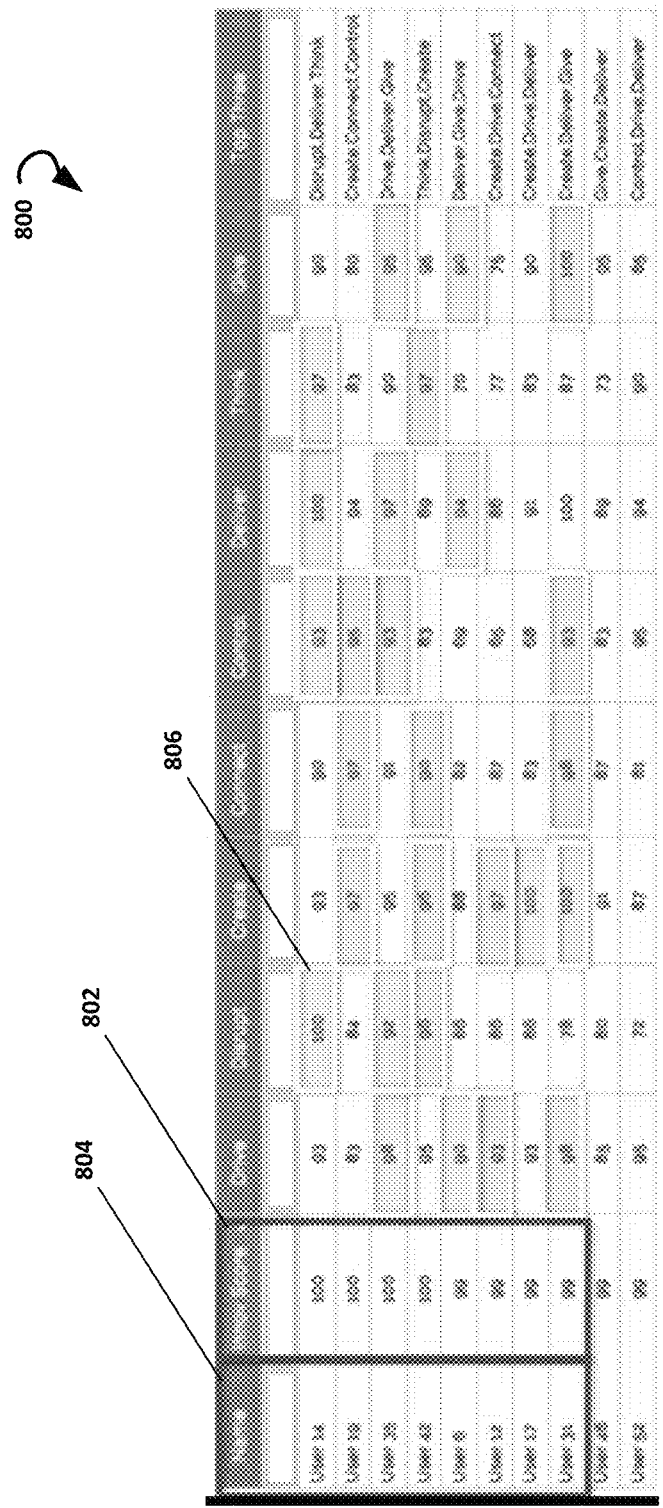
FIG. 8 is an example matrix that represents selections by a profiler system of an optimal innovation team, selected in accordance with the present disclosure.

The individual receives their personal results, along with a user-friendly interpretation guide. The management report is sortable, enabling managers to identify individuals with strengths in a particular skill cluster, to strengthen teams at various stages of the innovation journey (as illustrated in FIG. 8).

By definition, an entrepreneur score is a mathematical representation of behavioral traits of individuals who start or co-found businesses. Within an existing enterprise, these individuals may be best suited to efforts where there is a higher degree of autonomy and financial up-side. Skill clusters associated with an entrepreneur include drive, control, and create. Additional aspects of skill clusters are provided in greater detail infra.

An intrapreneur score is a mathematical representation of behavioral traits of individuals who create new products and businesses within existing organizations. These individuals are well-suited to leading internal innovation projects and teams in complex organizational structures. Skill clusters associated with an intrepreneur include disrupt, connect, and think.

An implementer score is a mathematical representation of behavioral traits of individuals who excels as part of a team implementing innovations, regardless of whose idea it is. These individuals can take an ambitious challenge, limited direction, and navigate their way to get it done. Skill clusters associated with an implementer include deliver and think.

A champion score is a mathematical representation of behavioral traits of individuals who helps to drive an innovation culture, and engages others in an innovation movement. These individuals are useful for training and coaching employees on innovation skills and engaging them in innovation challenges. Skill clusters associated with a champion include connect and give.

Each of these scores is comprised of various skill clusters and skill clusters are, in turn, comprised of skill sub-clusters. Examples of skill clusters comprise drive, create, disrupt, control, connect, deliver, think, and give.

In one embodiment, skill clusters associated with drive include ambition (actively looking for problems to solve), initiative (initiates new endeavors more easily and more often than others), intensity (relates to focus and understanding of problems and how things work, as well as initiatives to learn new things), and persistence (confidence during opposition or challenges).

Skill clusters associated with disrupt include boundary breaking, thriving in uncertainty, and self-confidence. Skill clusters associated with disrupt include novelty-seeking, problem-solving, uncommon connections, and growth mindset. Skill clusters associated with connect include relating, persuading, team-building, and social intelligence. Skill clusters associated with control include 360-degree involvement, competitiveness, and financial orientation. Skill clusters associated with think include information capacity, rapid pattern recognition, and reflection. Skill clusters associated with deliver include contextual goal-orientation, resourcefulness, and adaptability. Skill clusters associated with give include benefiting others and making the world better.

The profiler system can provide each individual with a survey that comprises questions that solicit information from an individual that correspond to the skill clusters and their corresponding skill sub-clusters. The questions are generated from interviews or surveys obtained from known innovators and entrepreneurs. Thus, the methodologies of the present disclosure can improve or evolve as a knowledge base from innovators and entrepreneurs grows. This information can also be used to weight questions within a survey so that questions relating to skill sub-clusters that are highly indicative of the skill associated with the skill clusters/sub-clusters are weighed more heavily than questions that are less indicative of the skill cluster.

It will be understood that weighting is based on correlation between each question and known innovators with business results. Clustering is a sub-level of the aspect of the present disclosure where the strongest N questions were clustered based on factor analysis, in some embodiments.

An example question related to the skill of deliver includes "I can easily embrace a new direction if the first direction I've begun is not working out." An example question related to the skill of connect includes "I am able to excite and inspire others with my ideas." Each skill will have a plurality of questions that can each be weighted.

These questions are merely exemplary and will be tailored by the data within the knowledge base obtained from innovators and entrepreneurs.

To calculate a skill score, the profiler system will sum the weighted values determined for each question answered. In some embodiments, the skill score is adjusted using an acquiescence adjustment score "AAS" (multiplying coefficient), which accounts for proclivities of an individual.

According to some embodiments, generating the innovation profile involves providing a plurality of questions to an individual, where each of the questions comprises a weighting as mentioned above. For each role/skill, the profiler system calculates an item score for at least a portion of the plurality of questions by multiplying the item score with the weighting. Next, the profiler system calculates a total score for a skill by summing each of the item scores. In some embodiments, a weighted item score comprises an acquiescence adjustment score multiplied by an acquiescence adjustment score factor.

In one embodiment, the profiler system gathers basic information about the respondent's demographics, along with a core of 108 psychographic questions. The profiler system can include a set number of filler items that are used as decoys.

The AAS measures an individual's degree of acquiescence ("yes-saying" or the tendency to agree with statements, regardless of their content), a type of response bias that may occur in surveys. The technique adjusts individual innovation role scores based on responses to several pairs of questions where agreement with both items can be considered contradictory (e.g., "I like to surround myself with people from diverse backgrounds" versus "I prefer to associate with people who are similar to me . . . "), taking into account the known proportion of variance in the overall score that can be explained by the AAS.

Entrepreneur, intrapreneur and the overall innovator scores contain items that are most strongly associated with actual entrepreneurship and intrapreneurship. Items are also assigned weights based on the strength of their relationship with objective business results. The implementer score includes items that are most strongly associated with objectively defined professional experience around building and operationalizing innovations (e.g., having worked on implementing someone else's new product/service; innovation; having occupied roles in research and development, new product design, and so forth). Finally, the champion score consists of items that best represent skills around using and building the social/cultural environment that allows innovation to flourish in an organization.

Once innovation profiles have been generated for individuals (one or many) in an organization or other group (including a crowd implementation), the innovation profile can be parsed to determine individuals and groups who are high scoring and/or low scoring by skill clusters/sub-clusters.

Other feedback and/or analyses provided by the profiler system include identification of individuals in a team that have low scores on specific skills and skill clusters. The profiler system can then use a feedback loop to suggest automated, computerized training programs that will assist the individuals in improving their scores in the relevant skills and skill clusters. In another feedback loop the profiler system can identify individuals from a remaining pool of individuals in the organization who have skill and skill cluster scores that excel in the relevant (e.g., low) skill clusters. According to some embodiments, the system can maintain and access one or more training libraries that comprise training instruction in digital format. Each instance of training instruction can be tagged with skill tags that allow the library to be searched for training on at the skill level. For example, if the profiler system determines that an individual is not meeting or exceeding benchmark scores in drive or disrupt skill clusters, the system can search the library for training instruction that is tagged with skill clusters of drive and disrupt and automatically deliver the required training.

In one embodiment, the granularity of this process is adjustable so that training can be provisioned to an individual based on skill sub-clusters. For example, if the system determines that an individual is not benchmarking in persistence, the profiler system can search and retrieve library content on persistence training.

The profiler system can also retest the individual during and after training is complete, in order to re-score the individual and assess improvement. In some embodiments, when the individual is retested, the system will selectively adjust the questions so that the individual is presented with new questions that test the skill sub-cluster or skill cluster in general. Thus, the profiler system can improve the performance of an enterprise at the individual level, as well as a team and/or organization level.

By way of example, the profiler system can select a second portion (one or more individuals) of the plurality of individuals that can replace a portion of the plurality of individuals having an innovation score that does not meet or exceed an innovator benchmark or general population score. The second portion includes individuals that have an innovation score that meets or exceeds the innovator benchmark and the general population score. In this method, the profiler system is configured to improve the composition or makeup of a team, which ensures improved innovation performance in the enterprise or organization.

In another embodiment, the profiler system can create an optimal innovation team that includes a selection of a plurality of individuals with highest innovation scores that cover eight skill clusters comprising drive, create, disrupt, control, connect, deliver, think, and give. Thus, the plurality of individuals forms a team that is well rounded in all relevant skill areas/clusters. Again, the profiler system can further tailor the selection of the individuals based on a project type and/or innovation stage.

In yet another embodiment, an optimal innovation team is determined based on a list of functional skills required for the team as well as their innovation profiles. For example, the profiler system can build a functionally-balanced team that also requires innovation skills which can be selected from any of the innovation skills described herein.

Figure 2:
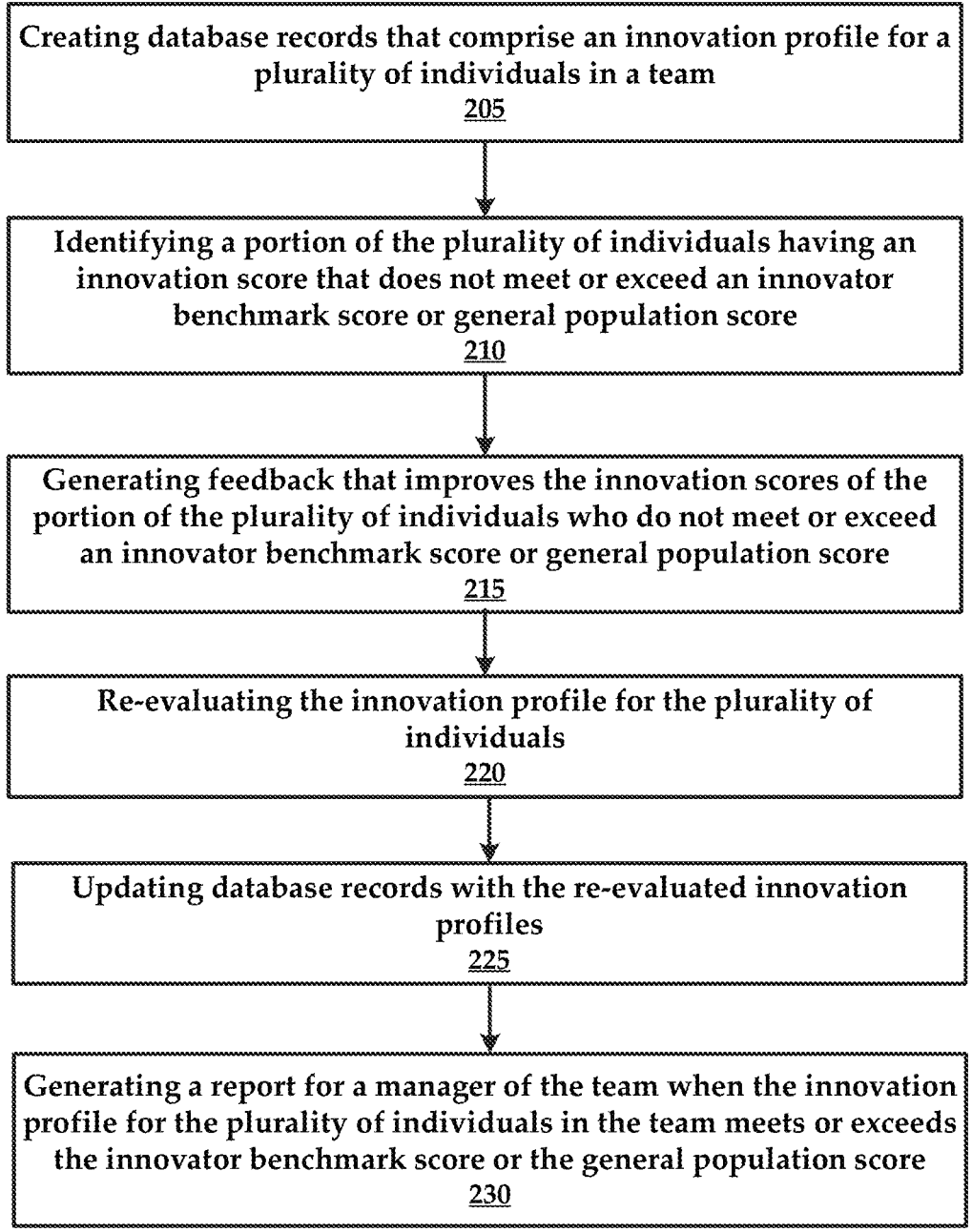
FIG. 2 is a flowchart of an example method for analyzing plurality of individuals in a team for innovation skills.

FIG. 2 is a flowchart of an example method of the present disclosure. In one embodiment a method includes a step 205 of creating database records that comprise an innovation profile for a plurality of individuals in a team. The innovation profile is generated using the survey process described above. The method includes a step 210 of identifying a portion of the plurality of individuals having an innovation score that does not meet or exceed an innovator benchmark score or general population score.

The method further comprises a step 215 of generating feedback that improves the innovation scores of the portion of the plurality of individuals who do not meet or exceed an innovator benchmark score or general population score. Numerous examples of feedback are described above in greater detail such as identifying weak skill areas or individuals in the same organization or population that have skill values that meet or exceed the innovator benchmark values. While the method involves the use of innovator scores, the profiler system can operate on a more granular level and use skill cluster/skill sub-cluster values in its analysis.

In some embodiments, the method includes a step 220 of re-evaluating the innovation profile for the plurality of individuals and a step 225 of updating database records with the re-evaluated innovation profiles.

Figure 7:
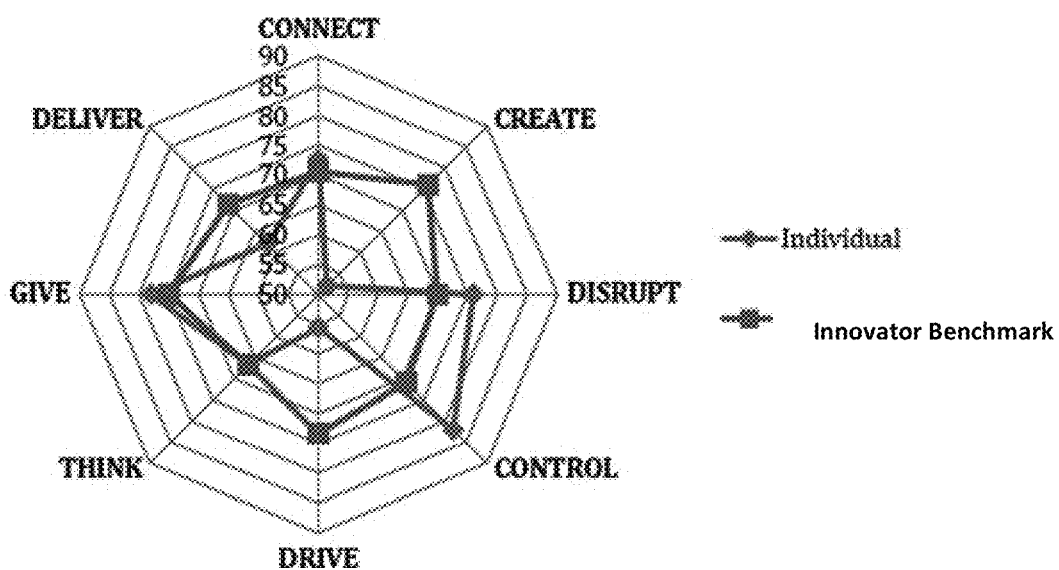
FIG. 7 is an example graph that illustrates an individual's scores compared against benchmark values.

According to some embodiments, the method comprises a step of 230 generating a report for a manager of the team when the innovation profile for the plurality of individuals in the team meets or exceeds the innovator benchmark score or the general population score. An example report is illustrated in FIGS. 6A-7.

Figure 3:
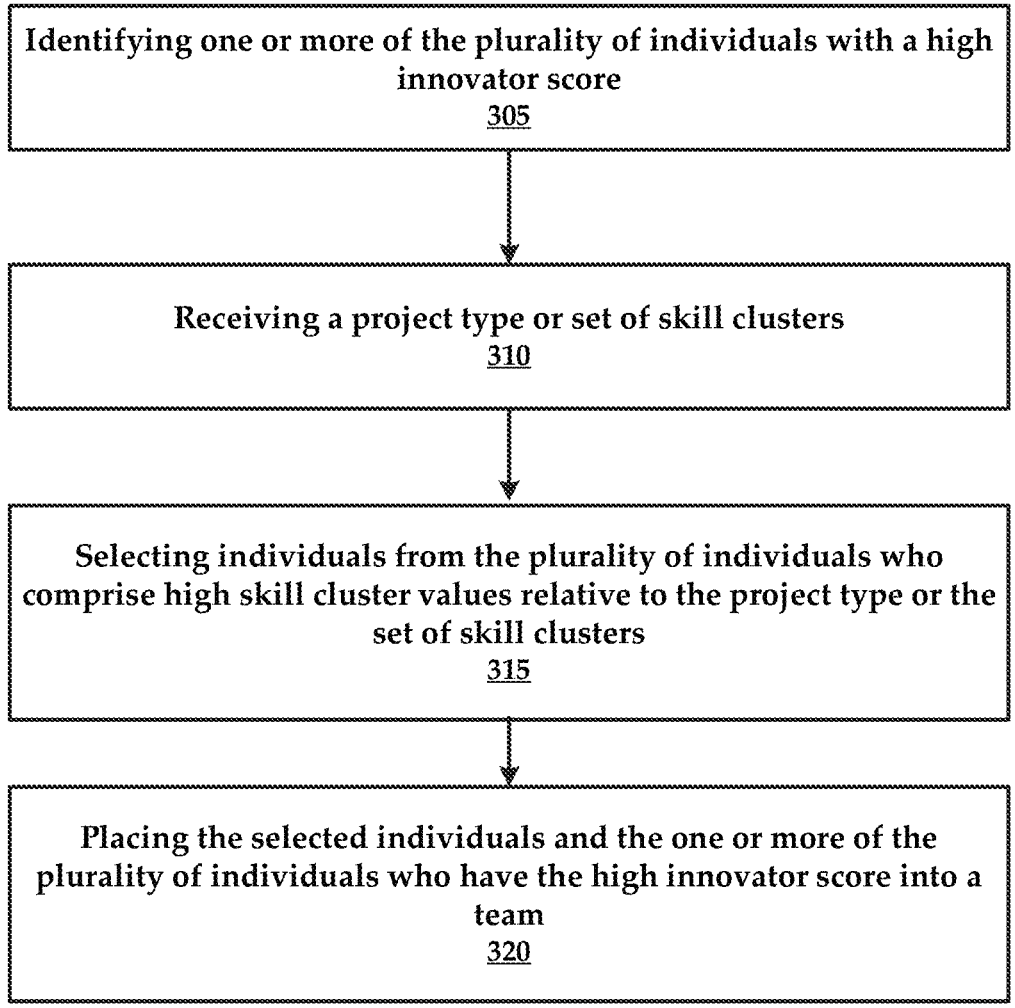
FIG. 3 is a flowchart of a feedback method implemented within a profiler system of the present disclosure.

FIG. 3 is a flowchart of another feedback method of the present disclosure that includes a step 305 of identifying one or more of the plurality of individuals with a high innovator score. The profiler system can then build a team around this entrepreneur by performing a step 310 of receiving a project type or required set of skill clusters. This step defines what type of team is built by the profiler system based on the defined project or required set of skill clusters. For example, the profiler system can receive a request to create a team that excels in product development and disruptive innovation. The profiler system will identify individuals in the organization that meet these criteria. These individuals have various skill sets that complement the individual identified with the high entrepreneur score in some embodiments. In other embodiments, the team can be created without an individual designated as an entrepreneur within the team. Next, the method includes a step 315 of selecting individuals from the plurality of individuals who comprise high skill cluster values relative to the project type or the set of required skill clusters.

Once these optimal individuals are determined, the method includes a step of 320 placing the selected individuals and the one or more of the plurality of individuals into a team.

Figure 4:
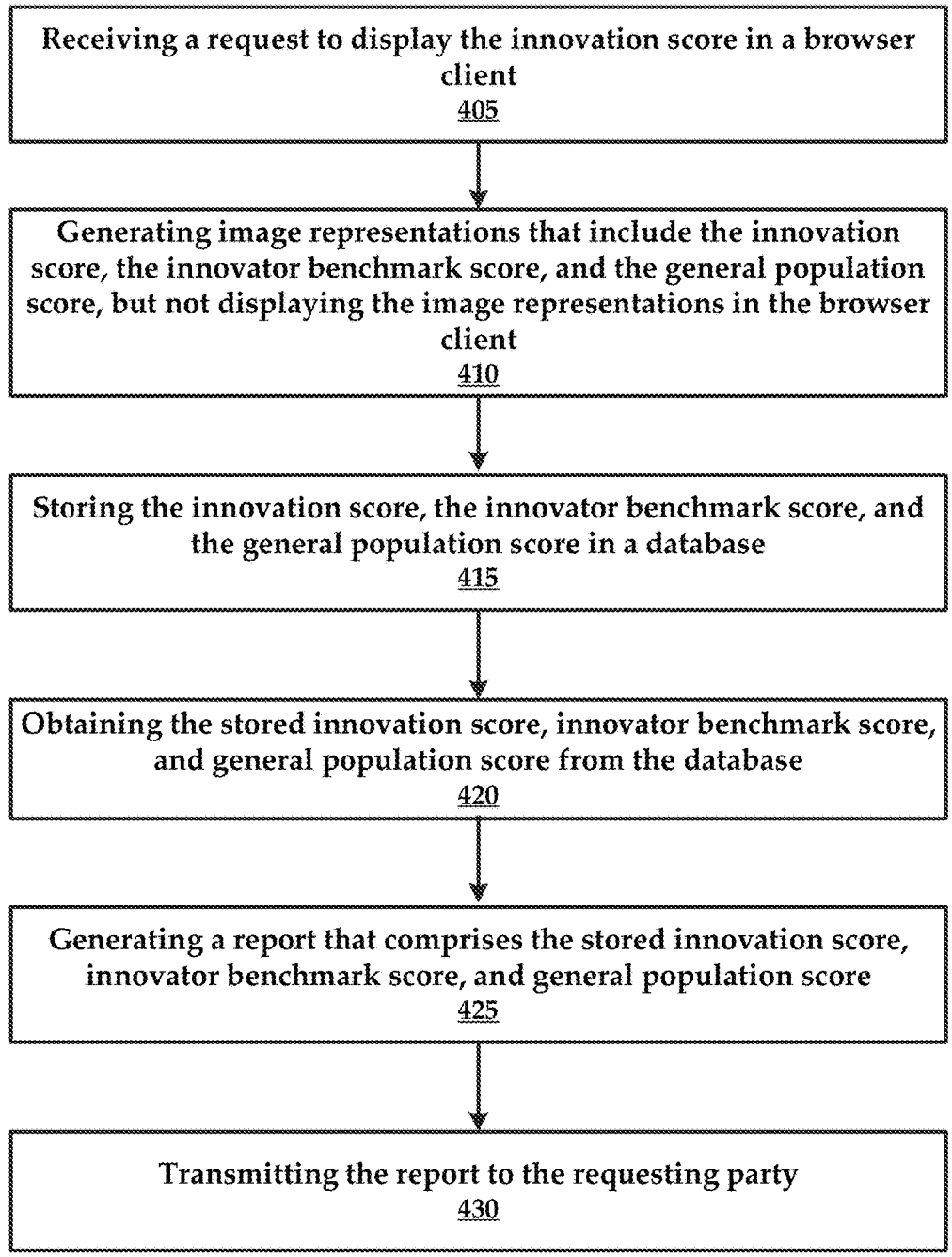
FIG. 4 is a flowchart of a method of generating an innovation score report for an individual.

In some embodiments, the profiler system is configured to execute a method of generating an innovation score report for an individual. FIG. 4 is a flowchart of an example method of generating an innovation score report by a step 405 of receiving a request to display the innovation score in a browser client. For example, the individual can respond to the survey questions and request that the profiler system provide them with a report that is indicative of their innovation skills/scores.

Figure 5:
FIG. 5 is a screenshot of an example graphical representation of an innovation score, innovator benchmark score, and general population score.

The method includes a step 410 of generating image representations that include the innovation score, the innovator benchmark score, and the general population score, but not displaying the image representations in the browser client. An example series of representations are illustrated in FIG. 5 as a user interface 500. The interface 500 comprises an individual's innovation score 505, a general population benchmark 510, and an innovator benchmark 515.

The representations are image files that are generated by the profiler system and placed into the HTML page in such a way that the individual cannot see the image files (which in some embodiments include graphs) initially.

In some embodiments, the method includes a step of 415 storing the innovation score, the innovator benchmark score, and the general population score in a database.

A report is then assembled by a step 420 of obtaining the stored innovation score, innovator benchmark score, and general population score. The report is generated in step 425. The report can then be transmitted to a requesting party in step 430. The requesting party can include a supervisor or manager, and in some embodiments the individual who completed the survey.

FIGS. 6A and 6B collectively illustrate a sample report 600 that includes an analysis of skill clusters, skill sub-clusters, sub-cluster scores, skill cluster scores, all arranged into a table format. The various scores are each compared to benchmark values that allow the reader to compare the individual to various benchmark values. Again, the benchmark values are related to entrepreneurs and/or intrapreneurs self-reported or determined skill scores calculated by the profiler system.

FIG. 7 illustrates an example graph 700 that illustrates an individual's scores compared against benchmark values. As mentioned above, an "Innovator Benchmark" for each skill cluster is calculated as the median score for the top 30% of entrepreneurs. In some embodiments, individual results are shown compared to the Innovator Benchmark. The graph is a spider web graph 700 that displays an individual's skill scores against the Innovator Benchmark for each of the same scores. The spider web graph 700 provides an easy visual indicator of low scoring skills relative to the Innovator Benchmark values.

According to some embodiments, the present disclosure is directed to systems and methods that implement and utilize behavioral profiling and actionable feedback loops to identify innovation characteristics in a crowd of individuals. These systems and methods have particular utility in project types where innovation is needed on the front end or inception of a commercial process.

In one embodiment, the system is configured to provide a crowd of individuals with a task or project that allows the system to elicit ideas. For example, the system can interrogate individuals to provide ideas for a new product or to improve the function or usefulness of an existing product.

Using the answers and responses, the system can utilize one or more algorithms to calculate a prolifacy score and a disruption score. The prolifacy score is indicative of the number of ideas generated on a per individual basis. This raw number can be placed into ranges of scores such as 0-5, 6-10, and so forth.

The disruption score is indicative of how disruptive the ideas are. In some embodiments, the ideas are evaluated by innovation experts, and in some embodiments a crowd review.

In a second aspect of the evaluation, individuals in the crowd are required to respond to a survey of questions. The survey includes a series of self-descriptive questions relating to dimensions commonly associated with innovators, such as curiosity, independent thinking, impatience with the status quo, accomplishment in the visual arts, scientific inquiry or inventions, number of social connections and social influence. The system can then cross-reference the answers to the most prolific and disruptive individuals to answers on the self-descriptive questions.

In some embodiments, the system is configured to retain self-descriptive questions with a high correlation among Prolific/Disruptor individuals, and eliminate questions with a low correlation. The system then selects individuals from the database to create a group, which is both more prolific and more disruptive than the general population. The system codes these individuals as "Ideators."

The system can assign one of four roles (or potentially none) to an individual based on their survey answers.

In some embodiments, the profiler system of the present disclosure can identify clusters of innovation skills that are tied to specific skill types such as ideators, optimizers, visualizers, and influentials. An ideator is a prolific idea creator. When these individuals are paired with disruptive thinkers, a large number of relevant and divergent ideas can be produced. Optimizers are individuals who excel at critiquing and improving products and services. Visualizers are individuals who can give abstract ideas a concrete form and bring ideas to fruition. Influentials are individuals who are highly networked and consulted for valued opinions. These individuals are frequently early product adopters and drive acceptance of new products/technology.

According to some embodiments, the system can tailor or suggest a group of individuals for a project type based on their assigned roles. Stated otherwise, based on a set of innovation project objectives, the system can selectively adjust a group of individuals to consist or comprise different combinations/permutations of individuals with selected skill groups.

In another application, the system can be configured to determine compositions of individuals that can be combined into a team or crowd to serve a specific project type such as commercial innovation, incremental innovation, and breakthrough innovation. In some embodiments, commercial innovation can benefit from individuals who are influential and visualizers. Incremental innovation project types can benefit from individuals that are optimizers and breakthrough innovation project types can benefit from individuals who are ideators and visualizers.

In some embodiments, an optimal innovation team that comprises a selection of the plurality of individuals with highest innovation scores that cover eight skill clusters comprising drive, create, disrupt, control, connect, deliver, think, and give.

The profiler system can also be configured to select an optimal innovation team based on a list of innovation skills required for the team. For example, if it is desired to create a team that is needed for a breakthrough innovation project, the profiler system can locate individuals with scores that are indicative of being an ideator or visualizer.

In another embodiment, the optimal innovation team is selected based an innovation stage selected from front-end ideation, product market fit, and scaling. Thus, the optimal innovation team can be selected based on needed functional skills, project types, and project timing, as well as combinations thereof.

FIG. 8 is a screenshot of a matrix that illustrates selection by a profiler system of an optimal innovation team. The team includes individuals with high overall innovation scores which are needed to form a new team. Thus, the project type is "new team." The profiler system automatically selects individuals for the team. In one embodiment the team is comprised of eight individuals, each with high overall scores. Each member has multiple strengths. Each skill cluster has a minimum of three team members with high scores. Again, the profiler system can identify these individuals from their behavior profiles stored in the database, where the behavior profiles have been constructed in accordance with the methodologies described above.

In some embodiments, the profiler system automatically selects the individuals for the team and highlights the individuals selected within the UI, such as with boxes 802 and 804. For reference, the profiler system can also highlight individual skill cluster and sub-cluster scores that were utilized and the basis for determining the permutation of individual selected for the team. For example, the system can highlight skill cluster value cells, such as cell 806, with a second color.

The reports can be generated each time an individual in an organization completes a survey. In other embodiments, a report is delivered to a manager or owner of the organization when an individual does not meet or exceed a benchmark innovation value. In one embodiment, the organization can use the survey and scoring methodologies in employment hiring or organizational development. For example, if the organization needs to hire for a critical innovation role, the profiler system can survey and score employment candidates and compare the skill clusters, sub-clusters, and innovation scores to a job profile. In this instance, the job profile at least includes a behavior profile that defines a set of skill clusters/sub-clusters that are desired for the position. Thus, rather than evaluating candidates based on typical hiring criteria, the profiler system can allow the organization to hire an individual based on their innovation profile. To be sure, the process can also integrate traditional candidate profiling techniques that would be known to one in the art.

Figure 9:
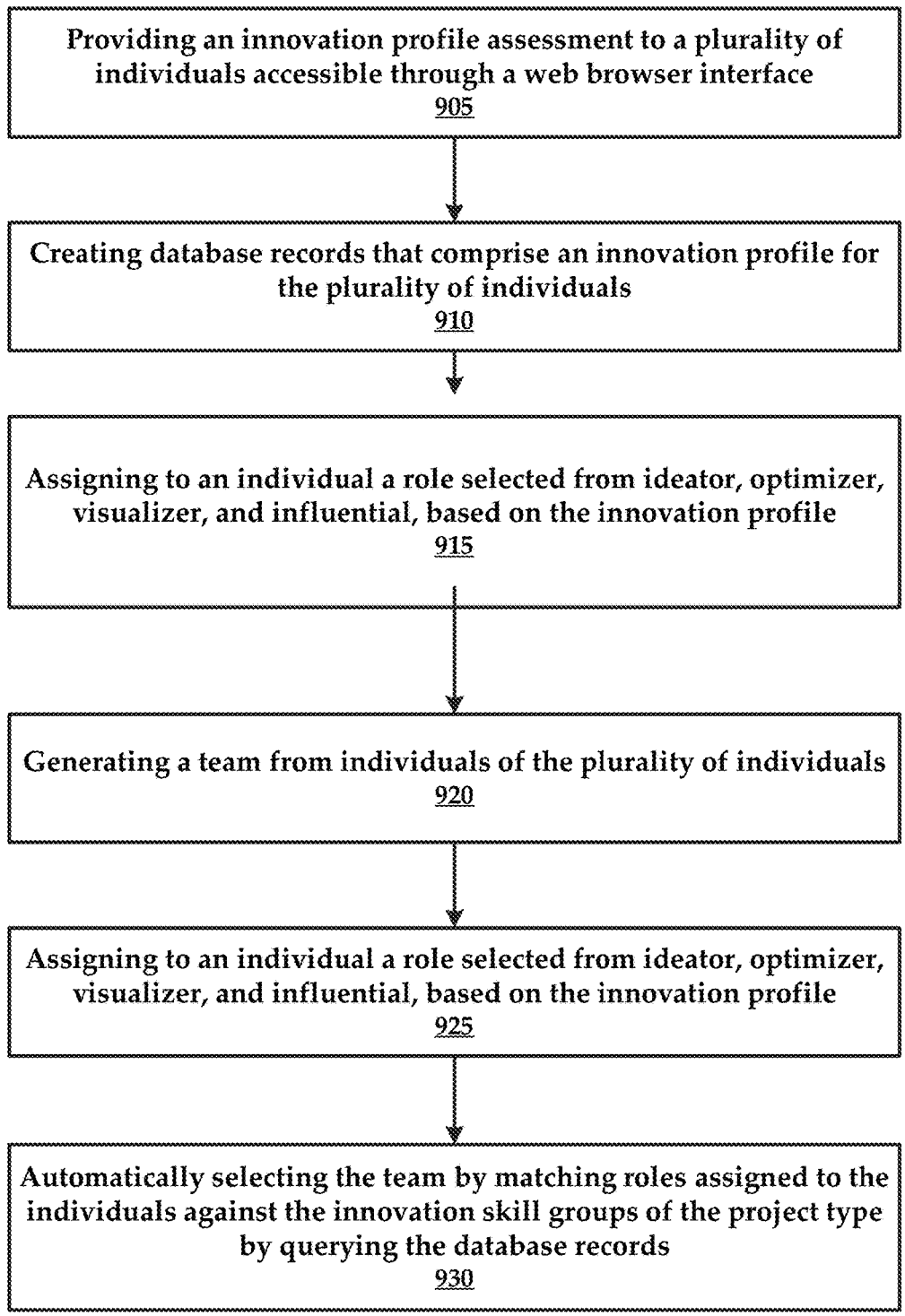
FIG. 9 is a flowchart of an example method of the present disclosure.

FIG. 9 is a flowchart of an example method that includes a crowd-specific embodiment of the present disclosure. The method includes a step 905 of providing an innovation profile assessment to a plurality of individuals accessible through a web browser interface. Next, the method includes a step 910 of creating database records that comprise an innovation profile for the plurality of individuals. To be sure, the innovation profile is indicative of a degree to which an individual is prolific and disruptive idea generator.

According to some embodiments, the method includes a step 915 of assigning to an individual a role selected from ideator, optimizer, visualizer, and influential, based on the innovation profile.

In some embodiments, the method includes a process 920 of generating a team from individuals of the plurality of individuals by a step 925 of receiving a project type selected from commercial innovation, incremental innovation, and breakthrough innovation. In one embodiment, the project type is associated with innovation skill groups. Some embodiments include a step 930 of automatically selecting the team by matching roles assigned to the individuals against the innovation skill groups of the project type by querying the database records.

Figure 10:
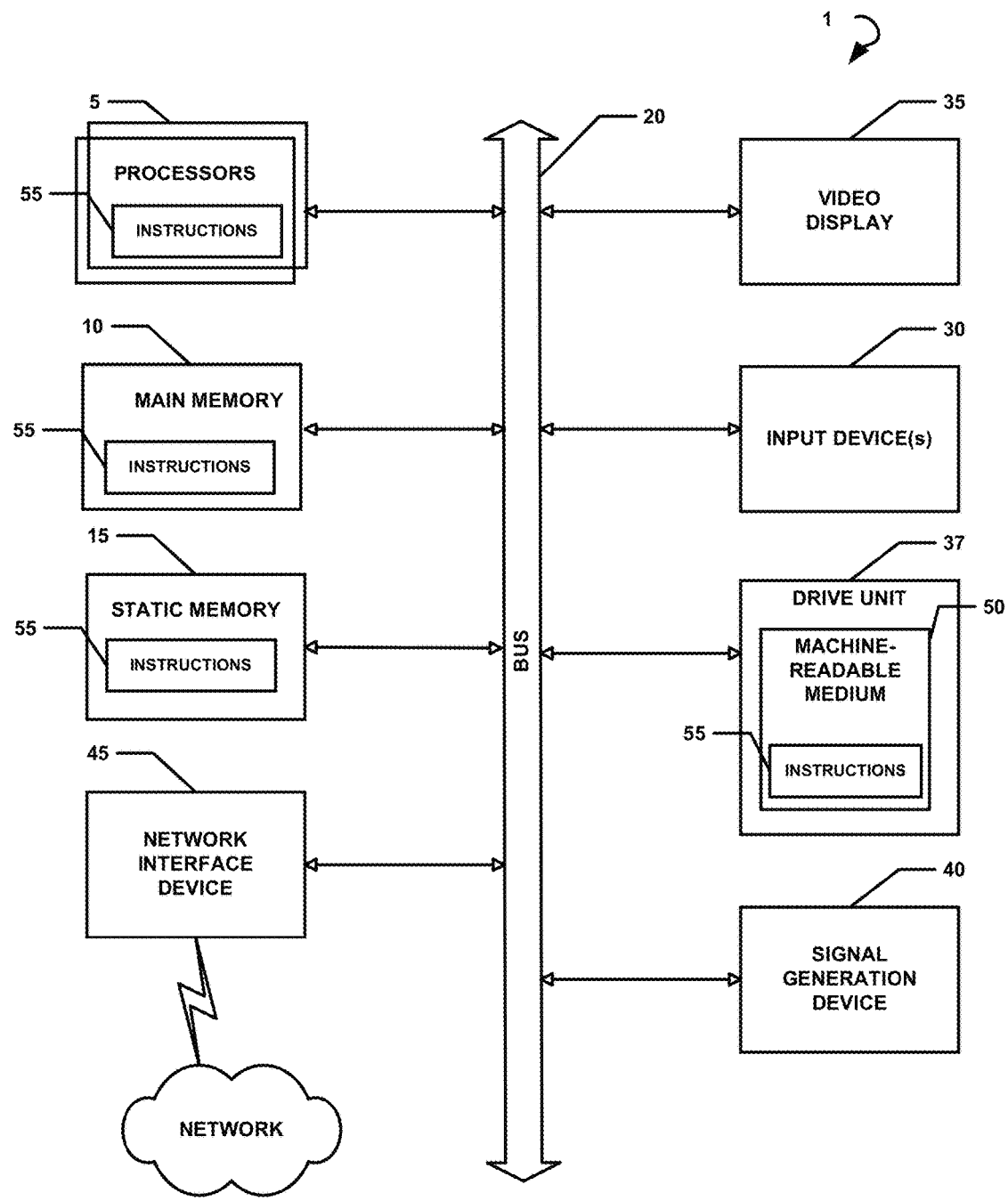
FIG. 10 is a schematic diagram of an example computer device that can be utilized to implement aspects of the present technology.

FIG. 10 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases in "one embodiment" or in "an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method, comprising:
creating, using a processor of a computer system, database records that comprise an innovation profile for a plurality of individuals, the innovation profile being indicative of an innovation score for each of the plurality of individuals, wherein the innovation score is a numerical value that is calculated from an entrepreneur score and an intrapreneur score, and storing the database records in a main memory of the computer system;
identifying, using the processor, a portion of the plurality of individuals having an innovation score that does not meet or exceed an innovator benchmark score;
generating feedback for the portion of the plurality of individuals whereby those individuals improve their innovation scores through the feedback, the feedback including an automated and computerized training program provided through a web browser interface to each said individual;
re-evaluating the innovation profiles for the portion of the plurality of individuals;
updating the database records for the portion of the plurality of individuals in the main memory with the re-evaluated innovation profiles; and generating a report when the innovation profiles for the plurality of individuals meets or exceeds the innovator benchmark score.

2. The method according to claim 1, further comprising identifying a second portion of the plurality of individuals that can replace the portion of the plurality of individuals having an innovation score that does not meet or exceed the innovator benchmark, the second portion having an innovation score that meets or exceeds the innovator benchmark.

3. The method according to claim 1, further comprising identifying an optimal innovation team that comprises a selection of the plurality of individuals with highest innovation scores that cover eight skill clusters comprising drive, create, disrupt, control, connect, deliver, think, and give.

4. The method according to claim 3, wherein the optimal innovation team is determined based on a list of functional skills required for the team as well as innovation scores.

5. The method according to claim 4, wherein the optimal innovation team is determined based on either:
an innovation type selected from disruptive or incremental; or
an innovation stage selected from front end ideation, product market fit, and scaling.

6. The method according to claim 1, further comprising:
receiving data indicative of individuals with entrepreneurial and intrapreneurial success;
calculating an innovation score and skill clusters for each of the individuals; and
establishing innovator benchmark values based on the innovation score and skill clusters.

7. The method according to claim 1, further comprising generating the innovation profile by:
providing each of the plurality of individuals with self-descriptive questions that identify behavioral traits that are indicative of entrepreneurs, intrapreneurs, implementer, and champion; and
generating the entrepreneur score, the intrapreneur score, the implementer score, and the champion score, as well as eight skill cluster scores and 26 sub-cluster scores based on answers to the self-descriptive questions.

8. The method according to claim 1, further comprising:
identifying one or more of the plurality of individuals with a high innovator score;
receiving a project type or set of skill clusters;
selecting individuals from the plurality of individuals who comprise high skill cluster values relative to the project type or the set of skill clusters; and
placing the selected individuals and the one or more of the plurality of individuals into a team.

9. The method according to claim 1, further comprising generating the innovation profile by:
providing a plurality of questions, each of the questions comprising a weighting; for each role calculating an item score for at least a portion of the plurality of questions by multiplying the item score with the weighting; and
calculating a total score by summing each of the item scores, wherein a weighted item score is multiplied by an acquiescence adjustment score factor to remove yes-biased answers.

10. The method according to claim 1, further comprising generating a display of skill cluster values comprising drive, create, disrupt, control, connect, deliver, think, and give, wherein the display comprises a spider web graph and each of the skill cluster values are arranged radially around the spider web graph.

11. The method according to claim 10, further comprising generating an innovation score report by:
receiving a request to display the innovation score in a browser client;
generating image representations that include the innovation score, and the innovator benchmark score, but not displaying the image representations in the browser client;
generating a results page generation code;
storing the innovation score and the innovator benchmark score;
assembling an electronic report using the results generation code and the stored innovation score, and innovator benchmark score; and
transmitting the electronic report to a requesting party.

12. The method according to claim 1, further comprising calculating a composite score by:
calculating the entrepreneur score and the intrapreneur score using a sum of weighted scores for questions indicative to entrepreneur skills and intrapreneur skills;
adjusting the entrepreneur score and the intrapreneur score with an acquiescence adjustment score; and
calculating half of a sum of the adjusted entrepreneur score and the adjusted intrapreneur score.

13. The method according to claim 1, further comprising:
identifying strengths and weaknesses of the plurality of individuals using the innovation score, skill cluster scores, and skill sub-cluster scores;
assigning a role to at least a portion of the plurality of individuals using the innovation score, skill cluster scores, and skill sub-cluster scores;
provisioning automated, computerized training to improve skills of individuals identified as:
having an innovation score that does not meet or exceed an innovator benchmark score; and
having a skill cluster score that does not meet or exceed a skill cluster benchmark score.

14. The method according to claim 1, further comprising creating a team from a portion of the plurality of individuals based on their respective skill cluster scores, the teaming being created based on a project type.

15. A computer system, comprising:
a memory for storing instructions; and
a processor for executing the instructions to:
provide an innovation profile assessment to a plurality of individuals accessible through a web browser interface;
create database records that comprise an innovation profile for the plurality of individuals, the innovation profile being indicative of an innovation score for each of the plurality of individuals, wherein the innovation score is a numerical value that is calculated from an entrepreneur score and an intrapreneur score;
store the database records in the memory of the computer system;
assign to an individual a role selected from ideator, optimizer, visualizer, and influential, based on the innovation profile;
generate a team from individuals of the plurality of individuals by:
receive a project type selected from commercial innovation, incremental innovation, and breakthrough innovation, wherein the project type is associated with innovation skill groups; and automatically select the team by matching roles assigned to the individuals against the innovation skill groups of the project type by querying the database records.

* * * * *